United States Patent [19]

Kamiyama et al.

[11] Patent Number: 5,445,411
[45] Date of Patent: * Aug. 29, 1995

[54] INFLATABLE SEAT BELT APPARATUS

[75] Inventors: Misao Kamiyama; Kazuo Zeze, both of Hikone, Japan

[73] Assignee: Takata Corporation, Tokyo, Japan

[ * ] Notice: The portion of the term of this patent subsequent to Sep. 13, 2011 has been disclaimed.

[21] Appl. No.: 963,320

[22] Filed: Oct. 19, 1992

[30] Foreign Application Priority Data

Oct. 21, 1991 [JP] Japan .................................. 3-272601

[51] Int. Cl.⁶ .............................................. B60R 21/18
[52] U.S. Cl. .................................................... 280/733
[58] Field of Search ............................ 280/733, 730 R

[56] References Cited

U.S. PATENT DOCUMENTS

| | | | |
|---|---|---|---|
| 3,682,498 | 8/1972 | Rutzki | 280/733 |
| 3,738,681 | 6/1973 | Wada et al. | 280/733 |
| 3,791,670 | 2/1974 | Lucore et al. | 280/733 |
| 3,801,156 | 4/1974 | Granig | 280/733 |
| 3,929,348 | 12/1975 | Lawwill | 280/733 |
| 3,970,329 | 7/1976 | Lewis | 280/733 |
| 5,100,171 | 3/1992 | Faigle et al. | 280/736 |

FOREIGN PATENT DOCUMENTS

| | | | |
|---|---|---|---|
| 0183436 | 3/1989 | Japan | 280/733 |
| 1322360 | 7/1973 | United Kingdom . | |
| 1353577 | 5/1974 | United Kingdom . | |
| 88/07947 | 10/1988 | WIPO . | |

Primary Examiner—Eric D. Culbreth
Assistant Examiner—Paul Dickson
Attorney, Agent, or Firm—Armstrong, Westerman, Hattori, McLeland & Naughton

[57] ABSTRACT

Disclosed is an inflatable seat belt apparatus in which, under ordinary conditions, a bag-shaped belt, (2b) is maintained in a belt-shaped form. When a tongue (5) is engaged with a buckle device (4) in order to fasten the belt, a gas-flow hole (4a) and a gas-flow hole (5a) are registered with each other to form a single gas-flow passageway. Under normal conditions, however, the gas-flow holes (4a), (5a) are shut by caps (11), (12). At, this time a gas generator (9) does not operate and therefore the seat belt apparatus (1) performs a passenger restraining function similar to that of the conventional seat belt apparatus. In the event of an emergency, the gas generator (9) generates a gas which breaks the caps (11), (12) and flows into the bag-shaped belt (2b). As a result, the bag-shaped belt, (2b) expands substantially instantaneously and in a reliable manner. This makes it possible for the passenger to be reliably restrained by the bag-shaped belt (2b) inflated in this manner.

4 Claims, 5 Drawing Sheets

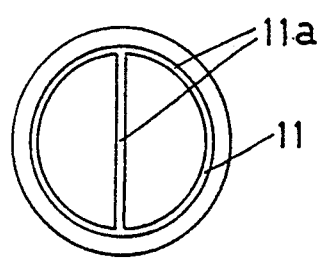
Fig. 4(a)
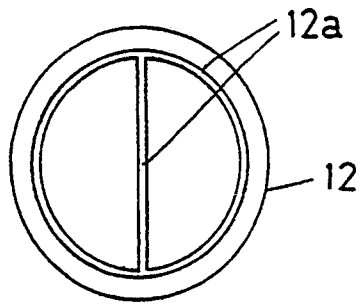
Fig. 4(b)
Fig. 7
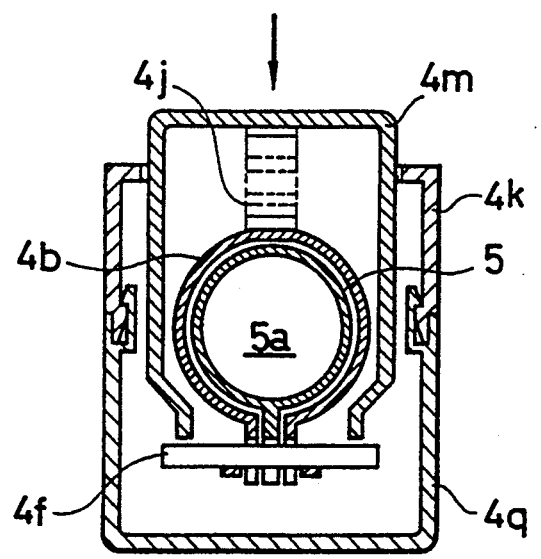
Fig. 8
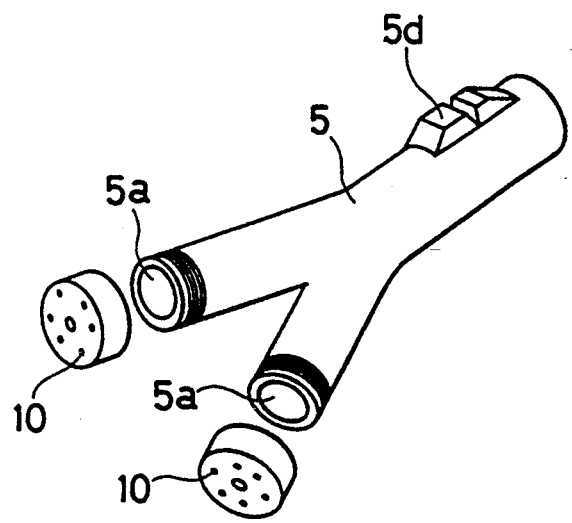

INFLATABLE SEAT BELT APPARATUS

BACKGROUND OF THE INVENTION

This invention relates to an inflatable seat belt apparatus having a webbing at least a portion of which is formed into a bag-like shape, wherein the webbing is maintained in a belt-like form during ordinary conditions and is inflated by gas from gas generating means at the time of an emergency.

The seat of a vehicle such as an automobile often is equipped with a seat belt apparatus. The seat belt apparatus is adapted to restrain a seated passenger by a webbing in the event of an emergency such as a vehicular collision, thereby protecting the passenger against injury caused by a collision. However, in a seat belt apparatus of this kind, the width of the webbing constituting a belt which restrains the passenger cannot be made very large, and therefore a comparatively large load acts upon the passenger locally when the passenger is restrained by the webbing.

In efforts to solve this problem, inflatable seat belt apparatus have been proposed, as disclosed in the specifications of Japanese Patent Application Laid-Open (KOKAI) Nos. 47-26830 and 49-88220, in which the webbing is formed into the shape of a bag and functions as an ordinary seat belt by being maintained in a belt-like form under ordinary circumstances. In the event of an emergency, a gas emitted from gas generating means is introduced into the bag-shaped webbing, thereby inflating the webbing so that the passenger is restrained by the inflated webbing. In accordance with an inflatable seat belt apparatus of this kind, the webbing receives the kinetic energy of the passenger over a wider area. Since the load is thus dispersed, the load which acts upon the passenger becomes comparatively small and the passenger is protected much more effectively.

When it is attempted to furnish a rear seat with an air bag apparatus of the kind provided in order to protect a passenger in the front seat, the air bag apparatus can only be installed in the front of the rear seat. In a case where an air bag apparatus is provided in the front seat, it is difficult to so arrange it that the air bag apparatus in the rear seat will protect the rear passenger properly and effectively since the position of the front seat differs depending upon whether it is moved forward or backward by the passenger, and since the reclining position of the front seat also differs depending upon the passenger. Accordingly, the above-described inflatable seat belt apparatus is particularly useful in the rear seat.

In the seat belt apparatus disclosed in the aforesaid publications, the inflatable webbing is passed through a through-hole provided in a tongue, whereby the tongue is free to slide along webbing. If the webbing becomes twisted or turns over in the tongue, not only is it impossible to apply the webbing correctly but smooth movement of the tongue along the webbing is impeded as well. Accordingly, it is required that the webbing hole formed in the tongue be designed to have a size that will not allow the webbing to become twisted or turned over. This means that there is a limitation upon the size of the hole and that the hole cannot be made very large.

However, if there is a limitation upon the size of the belt hole in the tongue, the inflation of the webbing is restricted by the tongue when the webbing is inflated by inflow of a gas to the bag-shaped webbing from the gas generating means in the event of an emergency. As a result, the injected gas cannot flow into the webbing smoothly from the location of the tongue, namely into the portion of the webbing in contact with the passenger. As a result, there are instances in which the portion of the webbing contacting the passenger is not inflated rapidly and reliably. In particular, since the webbing is folded at the belt through-hole of the tongue, the area of the gas flow passageway cannot be made sufficiently large and hence there is an even greater impediment to smooth flow of the gas.

Thus, if the portion of the webbing in contact with the passenger is not inflated rapidly and reliably, a case is conceivable in which it is impossible to reliably and fully realize the inflatable seat belt function of reducing the load upon the passenger by having the webbing disperse the load attributable to the kinetic energy of the passenger.

SUMMARY OF THE INVENTION

Accordingly, an object of the present invention is to provide an inflatable seat belt apparatus in which the inflatable webbing can be inflated reliably and rapidly at the time of an emergency.

According to the present invention, the foregoing object is attained by providing an inflatable seat belt apparatus having at least gas generating means for generating a gas upon being actuated at the time of an emergency, a webbing at least part of a portion which comes into contact with a passenger is formed into a bag-like shape, wherein the webbing is maintained belt-like form during ordinary conditions and the bag-like portion is inflated by the gas from the gas generating means at the time of an emergency, a tongue connected to the bag-shaped portion of the webbing, and a buckle device into which the tongue is inserted and locked in an unfastenable manner, the gas generating means being connected to the buckle device, the buckle device having a first gas flow hole communicating with the gas generating means, and the tongue having a second gas flow hole communicating with the interior of the bag-shaped portion, wherein when the tongue is inserted into and locked with the buckle device, the first gas flow hole and the second gas flow hole are communicated to form a gas flow passageway communicating the gas generating means and the bag-shaped portion of the webbing.

In the inflatable seat belt apparatus according to the invention constructed at set forth above, under ordinary conditions the webbing is maintained in the belt-like form and the inflatable seat belt apparatus performs a function similar to that of the common seat belt apparatus of the prior art.

When the tongue is inserted into and locked with the buckle device, the first gas flow hole in the buckle and the second gas flow hole in the tongue communicate, thereby forming a gas flow passageway which communicates the gas generating means and the bag-shaped portion of the webbing. In the event of an emergency, the gas generated by the gas generating means flows into the bag-shaped portion of the webbing through the gas flow passageway without being restricted. Accordingly, the webbing is inflated instantaneously and in reliable fashion so that the passenger is reliably restrained by the inflated webbing. Consequently, the restraining portion of the webbing that acts upon the passenger broadens so that the kinetic energy of the passenger is received over a wide area. This means that the load is dispersed so that the passenger is protected from large impact loads much more reliably. Furthermore, owing to the fact that the bag-shaped portion expands, slackness in the webbing is taken up to improve the passenger restraining capability of the belt.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims.

BRIEF DESCRIPTION OF THE DRAWINGS

FIG. 4 is a diagram showing caps for closing gas flow passageways of a tongue and a buckle device according to this embodiment;

FIG. 7 is a sectional view showing the tongue and buckle device of this embodiment in the connected state; and FIG. 8 is a perspective view showing a modification of a tongue used in the inflatable seat belt apparatus of the present invention.

DESCRIPTION OF THE PREFERRED EMBODIMENTS

Figure 1:
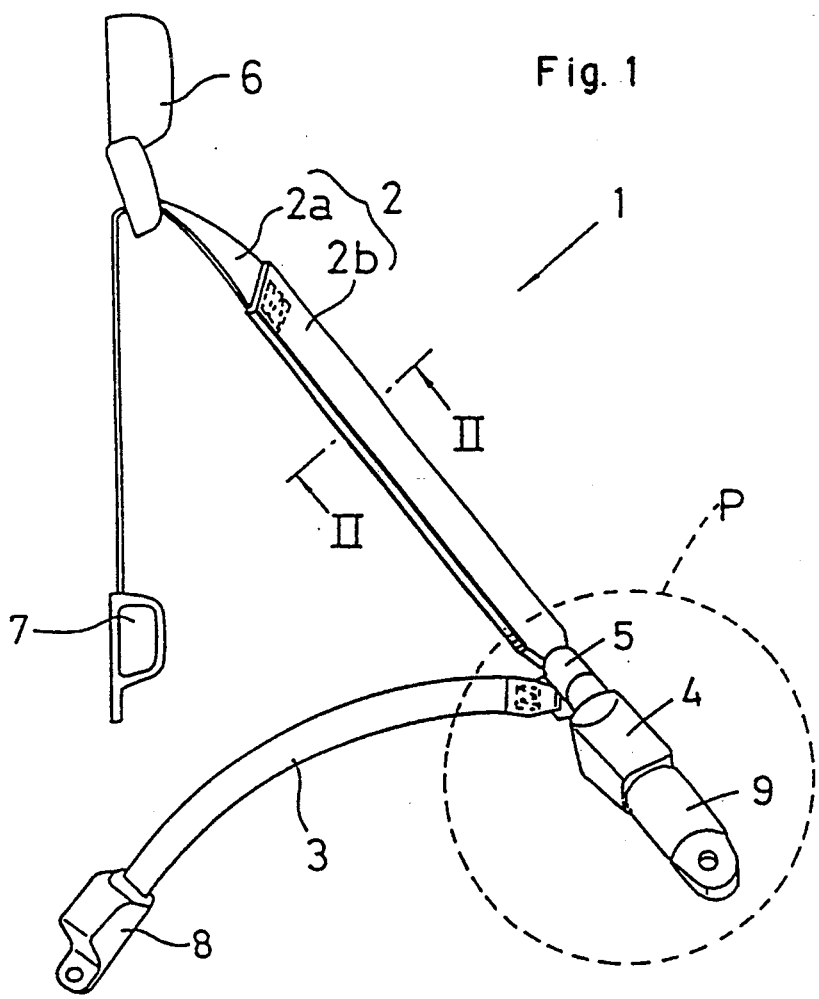
FIG. 1 is a schematic view showing the overall construction of an inflatable seat belt apparatus according to a first embodiment of the present invention.

As shown in FIG. 1, an inflatable seat belt apparatus 1 according to this embodiment includes a shoulder belt 2 extending diagonally from a left or right side (the right side of the passenger in the illustrated example) to the other side thereof, a lap belt 3 extending from the left or right side (the right side of the passenger in the illustrated example) to the other side thereof, a buckle device 4 fastened to the floor of the vehicle body, a tongue 5 inserted into and locked with the buckle device 4 when the seat belt is fastened, and an intermediate guide 6 which guides the shoulder belt 2.

The shoulder belt 2 is composed of a normal belt 2a similar to the common seat belt of the prior art, and a bag-shaped belt 2b one end of which is connected to one end of the normal belt 2a. The normal belt 2a is slidably guided by the intermediate guide 6 and has its other end connected to a seat belt retractor (ELR) secured to the vehicle body. A prescribed amount of the normal belt 2a is wound up by the seat belt retractor 7. By arranging it so that the normal seat belt 2a is passed through the intermediate guide 6 and wound up by the retractor 7, the shoulder belt 2 can be taken up and paid out smoothly and slack in the belt can be absorbed simply and accurately.

The bag-shaped belt 2b is situated where it will be contacted by the passenger, and the end thereof opposite that connected to the normal belt 2a is connected to the tongue 5. Thus, if the bag-shaped belt 2b is directly connected to the tongue 5, the length of the bag-shaped belt 2b can be readily set since the position of the buckle device 4 is fixed.

The lap belt 3 is formed by a normal belt similar to the conventional seat belt of the prior art. One end thereof is connected to the tongue 5, and the other end is connected to seat belt retractor (ELR) 8 secured to the vehicle body.

Connected to the buckle device 4 is a gas generator (G.G.) 9 actuated in the event of an emergency such as a vehicular collision to generate a high-pressure gas.

Figure 2:
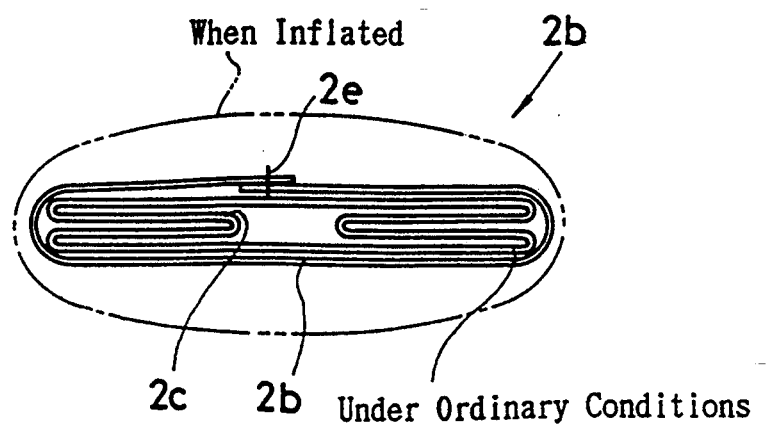
FIG. 2 is a sectional view taken along line II—II of FIG. 1.

As indicated by the solid lines in FIG. 2, the bag-shaped belt 2b has a bag-shaped belt main body 2c folded up and covered as by a cover 2d, both ends of which are sewn together at 2e, whereby the belt-shaped form is maintained when ordinary conditions prevail. The cover 2d is so designed that when the reaction gas is introduced from the gas generator 9, the sewn portion 2e readily separates under the expansion force of the shoulder belt 2 and does not interfere with the inflation of the shoulder belt 2. At this time the shoulder belt 2 reliably expands as indicated by the two-dot chain line in FIG. 2. It should be noted that the belt-shaped form of the bag-shaped belt 2b can also be maintained by lightly bonding the folded portions using a bonding agent or the like. Other appropriate methods may also be used. The portion at which the normal belt 2a and bag-shaped belt 2b of shoulder belt 2 are connected and the connection between the bag-shaped belt 2b and tongue 5 are maintained in an air-tight state.

Figure 3:
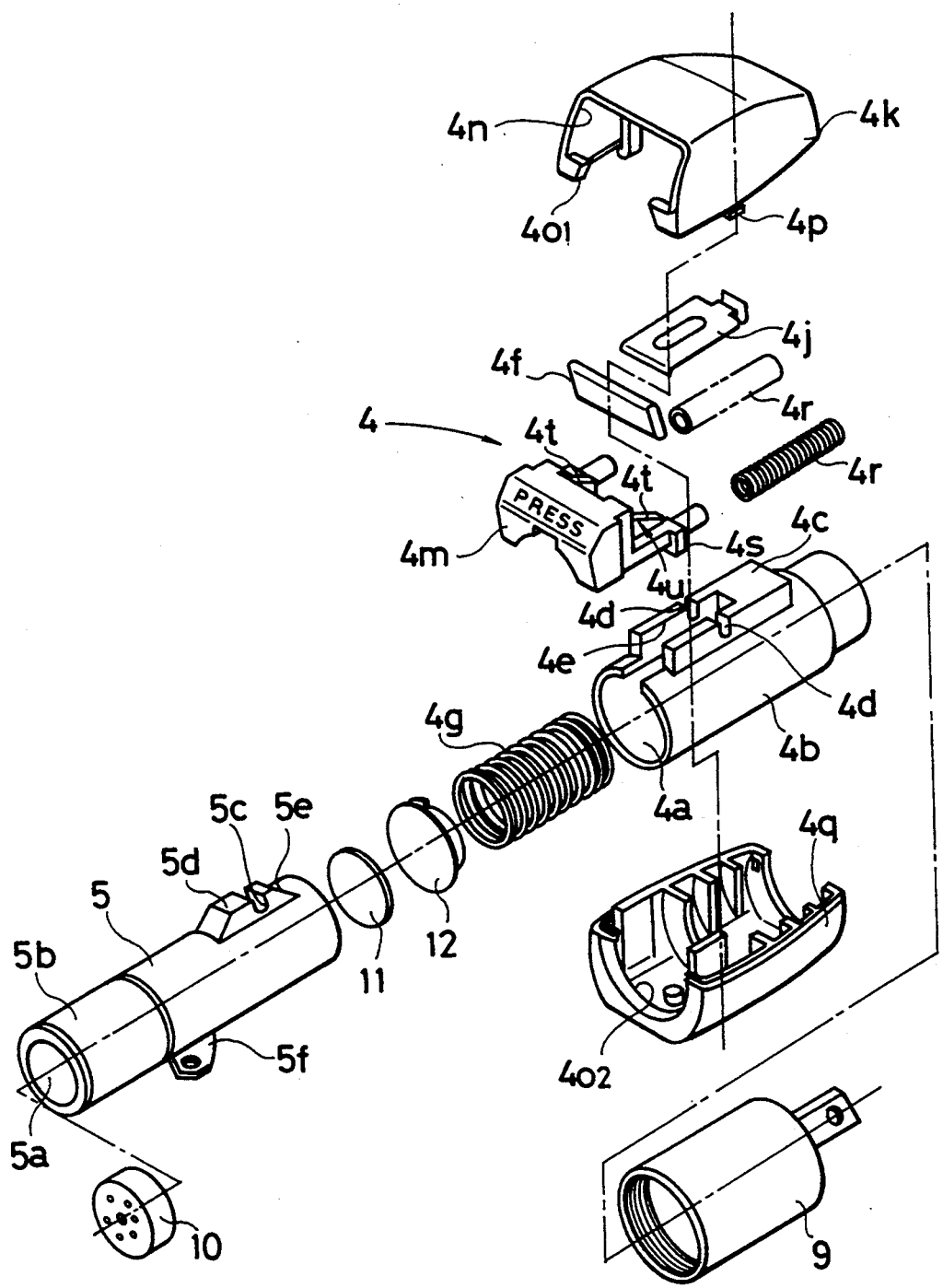
FIG. 3 is an exploded perspective view of a tongue and a buckle device according to the first embodiment, in which a portion P in FIG. 1 is shown in enlarged form.

As illustrated in FIG. 3, the tongue 5 is cylindrical in shape and has a gas flow hole 5a. The bag-shaped belt 2b is connected to one end 5b of the tongue. The tongue 5 has another end formed to include an engaging portion 5d having a groove 5c which mates with a pawl (shown at 4f in FIG. 3), described later. The other end of the engaging portion 5d has an inclined surface 5e. Further, a connecting portion 5f to which the lap belt 3 is connected is formed substantially at the middle of the tongue 5.

A filter 10 is situated in the gas flow hole 5a of tongue 5 at the end 5b thereof and is retained by a T-cap, and a tongue cap 11 (shown more clearly in FIG. 5) is provided in the gas flow hole 5a of tongue 5 at the other end thereof. The filter 10 serves to cool the gas which flows into the bag-shaped belt 2b and to prevent foreign matter from penetrating the bag-shaped belt 2b. As shown in FIG. 4(a), the tank cap 11 is provided with a groove 11a. Under ordinary conditions, the cap 11 hermetically seals the gas flow hole 5a of the tongue 5 and prevents foreign matter from entering the interior of the hole 5a. However, when the gas is generated in the event of an emergency, the cap readily breaks from the groove 11a under the pressure of the gas so that a gas flow passageway is assured.

Since the tongue 5 is formed to be cylindric 1 and the gas flow hole 5a need not be made very large, the overall tongue can be made compact, thereby enhancing operability with regard to connecting it to and disconnecting it from the buckle device 4.

As shown in FIG. 3, the buckle device 4 has a cylindrical main body 4b provided with a gas flow hole 4a. The arrangement is such that the other end of the tongue 5 can be fitted into the gas flow hole 4a from one end of the buckle main body 4b. The gas generator 9 is fixedly fitted into the other end of the buckle main body 4b. Furthermore, the outer peripheral surface of the buckle main body 4b is formed to have a projection 4c. A groove 4d into which the aforementioned pawl 4f is fittingly engaged is formed in the projection 4c in a direction perpendicular to the axial direction of the buckle. Further, the projection 4c and the buckle main body 4b are formed to have an axially extending groove 4e in which the engaging portion 5d of the tongue 5 is capable of being fitted.

Figure 5A:
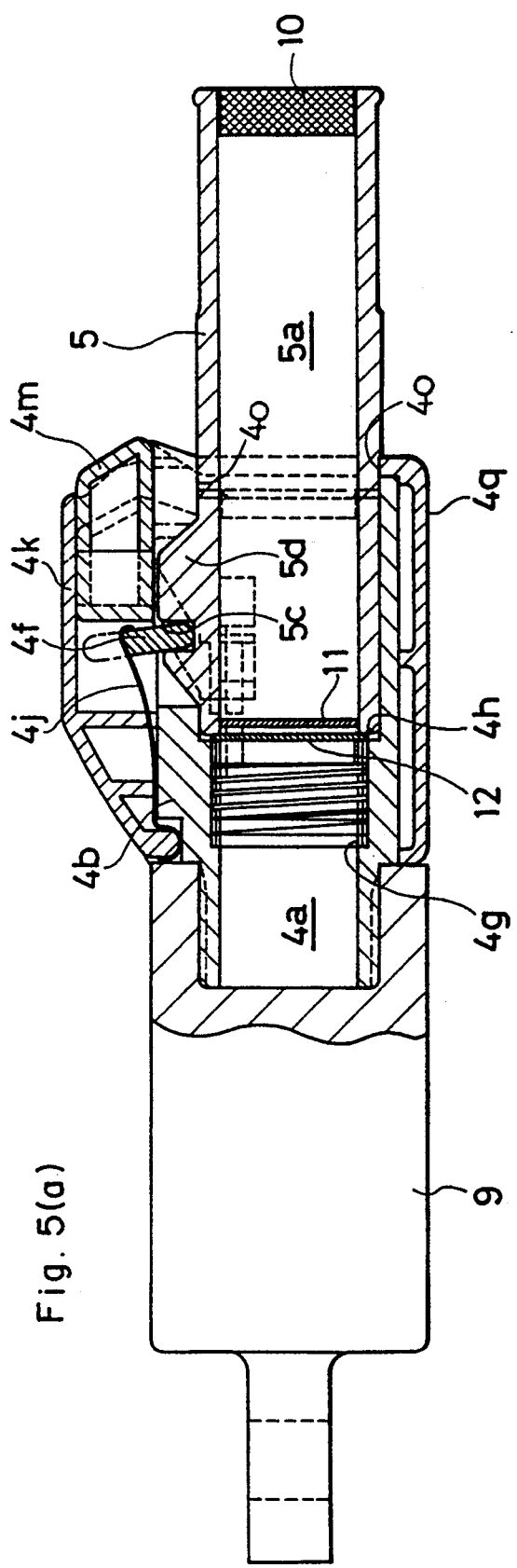
FIG. 5 illustrates a tongue and a buckle device in a connected state, in which (a) is a front view a portion of which is shown in section, and (b) a side view.
Figure 5B:
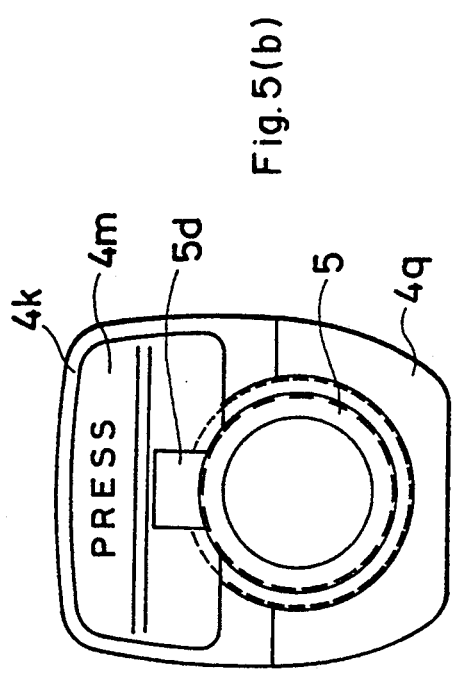

As illustrated in FIGS. 3 and 5, a spring 4g is disposed inside the gas flow hole 4a of the buckle main body 4b. The spring 4g biases the tongue 5, which has been fitted into the gas flow hole 4a, in the disengaging direction. A buckle cap 12 is attached to one end of the spring 4g. The buckle cap 12 is capable of sliding between a position at which the spring 4g is in the free state, which prevails when the tongue 5 has not been fitted into the gas flow hole 4a, and a position at which the cap 12 is urged into abutting contact with a step portion 4h of the gas flow hole 4a owing to insertion of the tongue 5 into the gas flow hole 4a.

The buckle gap 12 is provided with a groove 12a, as shown in FIG. 4(b). Under ordinary conditions, the cap 12 hermetically seals the gas flow hole 4a of the buckle main body 4b and prevents foreign matter from entering the interior of the gas flow hole 4a on the side of the gas generator 9. However, when the gas is generated in the event of an emergency, the cap readily breaks from the groove 12a under the pressure of the gas so that a gas flow passageway is assured.

As illustrated in FIG. 5, the pawl 4f is fitted into the groove 4d. The pawl 4f is constantly biased in a direction which fits it into the groove 4d by a spring 4j comprising a leaf spring. As a result, when the tongue 5 is fitted into the gas flow hole 4a of the buckle main body 4b, the pawl 4f is urged upward against the biasing force of the spring 4j by the inclined surface 5e of the projection 5d on the tongue 5 as the tongue 5 is moved in the axial direction. When the tongue 5 abuts against the step 4h of the gas flow hole 4a via the buckle cap 12, the groove 5c in the projection 5d of tongue 5 registers with the groove 4d of the buckle main body 4b, whereby the pawl 4f is mated with the groove 5c owing to the biasing force of the spring 4j. With the pawl 4f mated with the groove 5c, the tongue 5 is incapable of becoming disconnected from the buckle main body 5b. One end portion of the spring 4j is clamped between an upper cover 4k of the buckle device 5 and the projection 4c.

As shown in FIG. 3, the upper cover 4k is formed to have an opening 4n into which an operating button 4m is fitted, and a portion 4o₁ of an opening 4o into which the tongue 5 is fitted. The upper cover 4k is formed to have an engaging pawl 4p. The engaging pawl 4p engages with a mating portion (not shown) of a lower cover 4q when the upper cover 4k and the lower cover 4q are fitted together. As a result, a cover which covers the buckle main body 4b is formed. The lower cover 4q is formed to have another portion 4o₂ of the opening 4o into which the tongue 5 is fitted. The single circular opening 4o is formed when the upper cover 4k and lower cover 4q are fitted together.

The operating button 4m, which is fitted into the opening 4n of the upper cover 4k so as to be capable of moving back and forth, is constantly biased to project outwardly from the opening 4n by a pair of coil springs 4r compressed between the operating button 4m and the upper cover 4k. In this case, engaging protrusions 4s formed on both sides of the operating button 4m engage with locking portions (not shown) provided on the upper cap 4k at prescribed positions, whereby the amount of projection of the operating button 4m is limited. The position at which the engaging protrusions 4s engage with the locking portions of the upper cap 4k is the position occupied by the operating button 4m when it has not been operated, as indicated by the solid line in FIG. 5.

The left and right sides of the operating button 4m are formed to include a lifting portion 4u, which has an inclined surface 4t, for lifting the pawl 4f. The arrangement is such that the inclined surface 4t of each lifting portion 4u is situated below the pawl 4f when the operating button 4k is moved in the axial direction. When the operating button 4m is pushed inward to the position indicated by the dashed line in a state in which the tongue 5 and buckle device are connected together, as illustrated in FIG. 5, the inclined surface 4t comes into contact with the lower edge of the pawl 4f and lifts the pawl 4f upward as the operating button 4m is moved in the axial direction. As a result, the pawl 4f exits from the grooves 4d, 5c so that the tongue 5 and buckle device 4 disengage.

In the inflatable seat belt apparatus 1 of this embodiment constructed as set forth above, under ordinary conditions the bag-shaped belt 2 is maintained in the form of a belt. In addition, when the buckle device 4 and tongue 5 are not engaged, the gas flow hole 4a of the buckle device 4 is shut by the cap 12, and the gas flow hole 5a of the tongue 5 is shut by the cap 11. As a result, foreign matter will not enter the gas generator 9 and the bag-shaped belt 2b.

The passenger sits down in the seat and inserts the tongue 5 into the buckle device 4 until it locks, thereby fastening the belt. Since the pawl 4f fits into and engages the groove 5c with the belt in the fastened state, the tongue 5 will not slip out of the buckle device 4 and the connection between the tongue 5 and the buckle device 4 will be maintained. With the tongue 5 and the buckle device 4 in the connected state, the gas flow hole 4a and the gas flow hole 5a register with each other to form a single gas flow hole. Under ordinary conditions, however, the gas flow holes 4a and 5a are shut by the caps 11, 12.

Further, with the belt in the fastened state, the shoulder 2 and the lap belt 3 are biased in the take-up direction under a weak force by means of the seat belt retractors 7 and 8, respectively. However, the weak force does not subject the passenger to an oppressive sensation. In addition, since the take-up reels of the seat belt retractors 7 and 8 do not lock, the two belts 2, 3 can be pulled out freely. As a result, the shoulder belt 2 and lap belt 3 are pulled out and accommodated to follow up normal movement of the passenger, and therefore the seat belt affords greater comfort for the passenger.

When deceleration of a predetermined magnitude acts upon the vehicle while the vehicle is traveling, the passenger moves forward owing to an inertial force and the two belts 2, 3 attempt to pull out of the seat belt retractors 7, 8. However, deceleration sensors provided in the seat belt retractors 7, 8 are actuated at this time and cause the take-up reels to lock, as a result of which the belts 2, 3 are prevented from pulling out. Accordingly, the passenger is reliably restrained by the shoulder belt 2 and lap belt 3 and is prevented from being thrust forward. In this case the shoulder belt 2 contacts the passenger at the correct position owing to the intermediate guide 6. Thus, under ordinary conditions the inflatable seat belt apparatus 1 of this embodiment exhibits a passenger-restraining function similar to that of the ordinary seat belt apparatus according to the prior art.

In the event of an emergency when a very large deceleration acts upon the vehicle, as when a vehicular collision occurs, a deceleration sensor provided in the vehicle is actuated and causes the gas generator 9 to generate a high-pressure gas. As shown in FIG. 4, the generated gas flows instantaneously into the gas flow hole 4a of the buckle device and collides with the buckle cap 12, whereby the cap breaks. Since this allows a gas flow passageway to form, the gas then collides with the tongue cap 11 so that this cap breaks in similar manner. As a result, the gas flow hole 4a on the side of the buckle device 4 and the gas flow hole 5a on the side of the tongue 5 communicate so that the gas generator 9 is brought into direct communication with the bag-shaped belt 2b of the shoulder belt 2 and a gas flow passageway is formed between the gas generator 9 and the bag-shaped belt 2b. Consequently, gas generated by the gas generator 9 flows into the bag-shaped belt 2b so that the cover 2d separates under the pressure of the gas and allows the bag-shaped belt 2b to expand substantially instantaneously and in reliable fashion. In this case, the bag-shaped belt 2b does not experience folding. As a result, a sufficiently large gas flow area is assured so that the gas penetrates the interior of the bag-shaped belt 2 instantaneously and the efficiency of the gas is improved. In addition, any foreign matter such as residue caused by reaction with the gas in the gas generator 9 or fragments caused by breakage of the caps 11, 12 is captured by the filter 10, and therefore such foreign matter will not penetrate into the interior of the bag-shaped belt 2b.

Accordingly, the passenger is reliably restrained by the inflated bag-shaped belt 2b. As a result, the bag-shaped belt 2b broadens so that the kinetic energy of the passenger is borne over a wide area. The load therefore is dissipated so that the passenger is protected against large impact loads in a reliable manner. In addition, slack in the shoulder belt 2 is taken up owing to the expansion of the bag-shaped belt 2b, as a result of which the passenger-restraining performance of the belt is improved.

In order to disengage the tongue 5 and the buckle device 4, the operating button 4m is pressed inward, whereby the pawl 4f exits from the grooves 4d, 5c, thereby disengaging the tongue 5 and the buckle device 4. As a result, since the tongue 5 is biased in the direction of disengagement by the spring 4g, the tongue 5 readily separates from the buckle device 4.

Figure 6:
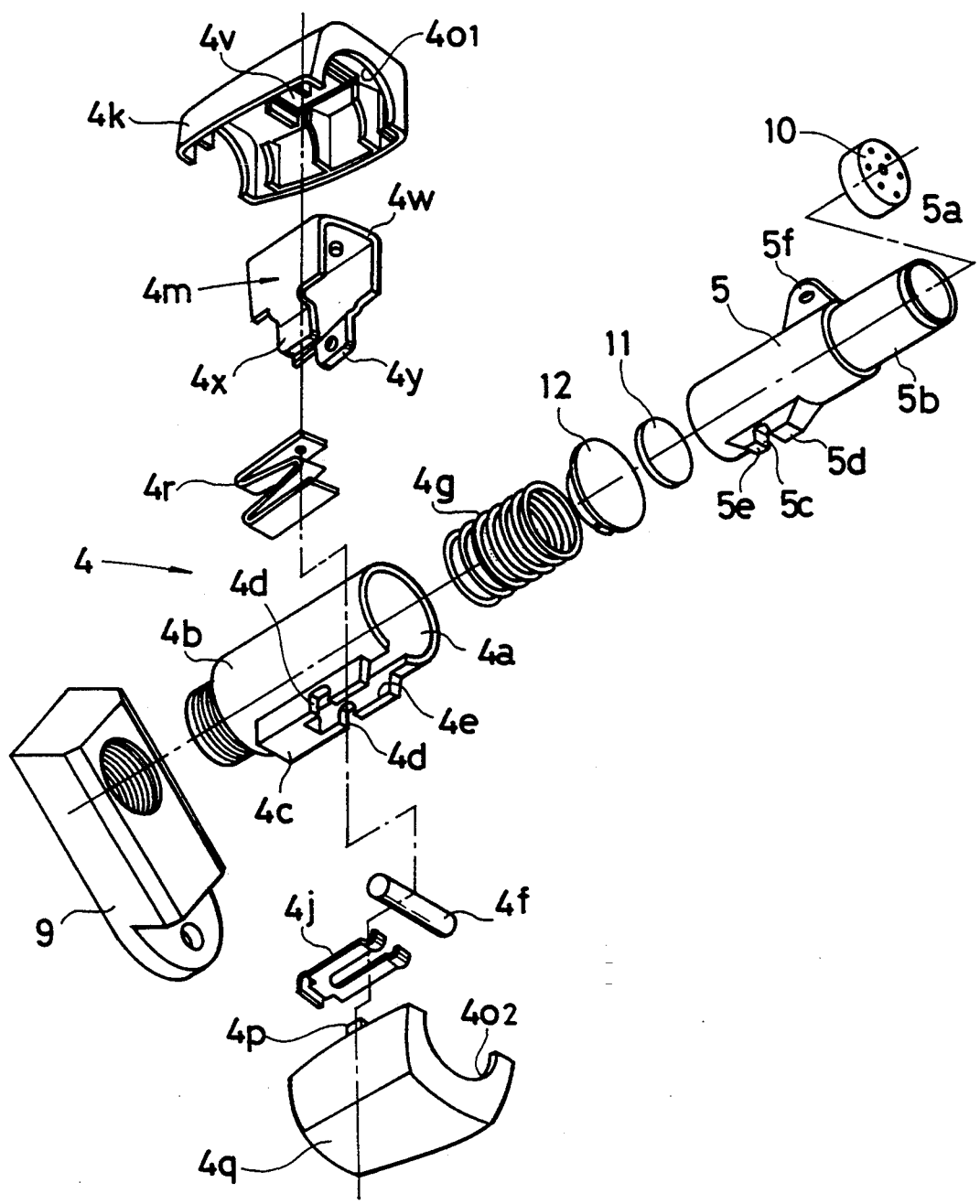
FIG. 6 is an exploded perspective view, similar to that of FIG. 3, showing a tongue and a buckle device according to another embodiment of the present invention.

FIG. 6 is a perspective view, similar to that of FIG. 3, showing another embodiment of the present invention. Elements identical with those of the first embodiment are designated by like reference characters and need not be described again.

In the foregoing embodiment, the arrangement is such that the operating button 4m for disengaging the tongue 5 and the buckle device 4 is operated in the axial direction. In this embodiment, however, it is arranged so that the operating button 4m is operated in a direction perpendicular to the axial direction. More specifically, the operating button 4m according to this embodiment has a squarish, inverted generally U-shaped cross section. As clearly shown in FIG. 7, the operating button 4m is urged upwardly at all times by a spring 4r compressed between the operating button 4m and the buckle main body 4b. The button has a crown 4w which projects upwardly through an opening 4v in the upper cover 4k. The operating button 4m is so arranged that the buckle main body 4b fits between the two side walls thereof. The lower edges of the two side walls are formed to have pawl pressing portions 4x, 4y which press the pawl 4f downward when the operating button 4m is pressed downward.

The pawl 4f is urged upwardly at all times by the spring 4j and fits into the groove 4d of the buckle main body 4b. Similarly, when the tongue 5 is fitted into the gas flow hole 4a of the buckle main body 4b by a prescribed amount, the pawl 4f fits into the groove 5c of the tongue 5 under the biasing force of the spring 4j. When the pawl 4f has been fitted into the groove 5c, the tongue 5 and the buckle device 4 cannot separate and the connection between them is maintained, just as in the first embodiment.

By pressing the operating button 4m downward, the pawl pressing portions 4x, 4y of the operating button 4m press the pawl 4f downward so that it is made to exit from the groove 5c. As a result, the tongue 5 and the buckle device 4 can be disconnected from each other.

The other elements of the inflatable seat belt apparatus of this embodiment, as well as the actions and effects thereof, are identical with those of the first embodiment described earlier and need not be described again.

The present invention is not limited to the foregoing embodiments and can be modified in various ways. For example, in the foregoing embodiments, the tongue 5 is provided solely with the gas flow hole 5a communicating with the bag-shaped belt 2b of the shoulder belt 2. However, as shown in FIG. 8, an arrangement can be adopted in which the gas flow hole 5a provided in the tongue 5 is formed into a bifurcated configuration, the lap belt 3 is formed into a bag-shaped belt and the gas flow hole 5a is capable of being communicated with the bag-shaped belt of the lap belt in addition to the bag-shaped belt 2b of the shoulder belt 2. This greatly improves the effectiveness of the inflatable belt and makes it possible to provide even greater protection for the passenger.

In the first embodiment, the gas flow holes 4a, 5a are formed to have a circular cross section. However, the cross sections of the gas flow holes 4a, 5a may have any desired shape.

Thus, in accordance with the inflatable seat belt apparatus of the present invention, as described in detail above, the inflatable seat belt apparatus performs a function similar to that of the common seat belt apparatus of the prior art when conditions are normal.

When the tongue has been fitted into and engaged with the buckle device, a gas flow passageway communicating the gas generator and the bag-shaped portion of the webbing is formed. In the event of an emergency, therefore, the gas generated by the gas generator can readily penetrate the bag-shaped portion of the webbing without being restricted. This enables the webbing to be inflated instantaneously and in reliable fashion. Accordingly, the portion of the webbing in contact with the passenger broadens so that the kinetic energy of the passenger is borne over a wide area. As a result, the load is dissipated and the passenger is protected from large impact loads much more reliably. Moreover, owing to the fact that the bag-shaped portion expands, slackness in the webbing can be absorbed to improve even further the passenger restraining performance of the belt.

As many apparently widely different embodiments of the present invention can be made without departing from the spirit and scope thereof, it is to be understood that the invention is not limited to the specific embodiments thereof except as defined in the appended claims.

What is claimed is:

1. An inflatable seat belt apparatus, comprising:

generating means for generating a gas upon being actuated at the time of an emergency;

a webbing having at least part of a portion that comes into contact with a passenger formed into a bag-shape, wherein said webbing is maintained in a belt-shape form during ordinary conditions and said bag-shape portion is inflated by the gas from said gas generating means at the time of an emergency;

a tongue connected to said bag-shaped portion of the webbing;

a buckle device into which said tongue is insertable and lockable in an unfastenable manner;

said gas generating means being connected to said buckle device;

said buckle device having a first gas flow hole communicating with said gas generating means;

said tongue having a second gas flow hole communicating with the interior of said bag-shaped portion;

wherein when said tongue is inserted into and locked with said buckle device, said first gas flow hole and said second gas flow hole are communicated to form a gas flow passageway communicating said gas generating means and said bag-shaped portion of the webbing;

wherein said webbing includes a shoulder belt and a lap belt each formed independently of each other and each being connected to said tongue, and said bag-shaped portion of the webbing includes at least a portion of said shoulder belt and at least a portion of said lap belt; and said second gas-flow hole in said tongue is bifurcated from a first path which communicates with said first gas-flow hole in said buckle device into one path which communicates with said portion of said shoulder belt and into another path which communicates with said portion of said lap belt;

said buckle device includes a first tubular member, said first gas flow hole extending along an axis in a lengthwise direction of said tubular member, and wherein said tongue device includes a second tubular member having a generally Y-shape, said second gas-flow hole being bifurcated in said second tubular member;

each of said first and second tubular members are generally cylindrical; and said buckle device is provided with a buckle side cap which is constructed to close said first gas flow hole during said ordinary conditions and which is constructed to open said first gas flow hole in said time of an emergency after being ruptured by gas released from said gas generating means, and further said tongue is provided with a tongue side cap which is constructed to close said second gas flow hole during said ordinary conditions and which is constructed to open said second gas flow hole in said time of an emergency after being ruptured by said gas.

2. An inflatable seat belt apparatus according to claim 1, wherein a filter is provided downstream from each of said caps and in said second gas flow hole, said filter preventing intrusion of foreign objects and said caps when ruptured into said bag-shape portion of said webbing.

3. An inflatable seat belt apparatus, comprising:

generating means for generating a gas upon being actuated at the time of an emergency;

a webbing having at least part of a portion that comes into contact with a passenger formed into a bag-shape, wherein said webbing is maintained in a belt-shape form during ordinary conditions and said bag-shape portion is inflated by the gas from said gas generating means at the time of an emergency;

a tongue connected to said bag-shaped portion of the webbing;

a buckle device into which said tongue is insertable and lockable in an unfastenable manner;

said gas generating means being connected to said buckle device;

said buckle device having a first gas flow hole communicating with said gas generating means;

said tongue having a second gas flow hole communicating with the interior of said bag-shaped portion;

wherein when said tongue is inserted into and locked with said buckle device, said first gas flow hole and said second gas flow hole are communicated to form a gas flow passageway communicating said gas generating means and said bag-shaped portion of the webbing;

wherein said webbing includes a shoulder belt and a lap belt each formed independently of each other and each being connected to said tongue, and said bag-shaped portion of the webbing includes at least a portion of said shoulder belt: and wherein said buckle device is provided with a buckle side cap which is constructed to close said first gas flow hole during said ordinary conditions and which is constructed to open said first gas flow hole in said time of an emergency after being ruptured by gas released from said gas generating means, and further said tongue is provided with a tongue side cap which is constructed to close said second gas flow hole during said ordinary conditions and which is constructed to open said second gas flow hole in said time of an emergency after being ruptured by said gas.

4. An inflatable seat belt apparatus according to claim 3, wherein a filter is provided downstream from each of said caps and in said second gas flow hole, said filter preventing intrusion of foreign objects and said caps when ruptured into said bag-shape portion of said webbing.

* * * * *